US010578018B2

(12) United States Patent
Schwarz et al.

(10) Patent No.: US 10,578,018 B2
(45) Date of Patent: *Mar. 3, 2020

(54) GEARED TURBOFAN ENGINE GEARBOX ARRANGEMENT

(71) Applicant: United Technologies Corporation, Farmington, CT (US)

(72) Inventors: Frederick M. Schwarz, Glastonbury, CT (US); William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 636 days.

This patent is subject to a terminal disclaimer.

(21) Appl. No.: 15/358,267

(22) Filed: Nov. 22, 2016

(65) Prior Publication Data

US 2017/0074165 A1 Mar. 16, 2017

Related U.S. Application Data

(60) Continuation of application No. 14/496,574, filed on Sep. 25, 2014, now Pat. No. 9,500,126, which is a (Continued)

(51) Int. Cl.
*F02K 3/00* (2006.01)
*F02C 7/06* (2006.01)
(Continued)

(52) U.S. Cl.
CPC ............... *F02C 7/06* (2013.01); *F01D 5/02* (2013.01); *F01D 5/06* (2013.01); *F01D 9/06* (2013.01);
(Continued)

(58) Field of Classification Search
CPC ............... F02K 3/06; F02C 3/107; F02C 3/06
See application file for complete search history.

(56) References Cited

U.S. PATENT DOCUMENTS 3,287,906 A 11/1966 McCormick
3,754,484 A 8/1973 Roberts
(Continued)

FOREIGN PATENT DOCUMENTS

EP 1921256 5/2008
EP 2551489 1/2013
(Continued)

OTHER PUBLICATIONS

Honeywell LF507. Jane's Aero-engines, Aero-engines—Turbofan. Feb. 9, 2012.
(Continued)

*Primary Examiner* — Gerald L Sung

(74) *Attorney, Agent, or Firm* — Carlson, Gaskey & Olds, P.C.

(57) ABSTRACT

A turbofan engine according to an exemplary aspect of the present disclosure includes, among other things, a fan having a plurality of blades, and a transmission is configured to drive the fan. The fan blades have a peak tip radius $R_T$. The fan blades have an inboard leading edge radius $R_H$ at an inboard boundary of the flowpath. A ratio of $R_H$ to $R_T$ is less than about 0.40.

24 Claims, 6 Drawing Sheets

Related U.S. Application Data division of application No. 14/087,471, filed on Nov. 22, 2013, now Pat. No. 8,869,504.

(51) Int. Cl.

| | |
|---|---|
| *F02K 1/09* | (2006.01) |
| *F02C 7/36* | (2006.01) |
| *F02C 3/107* | (2006.01) |
| *F02K 3/04* | (2006.01) |
| *F01D 5/02* | (2006.01) |
| *F01D 9/06* | (2006.01) |
| *F01D 17/10* | (2006.01) |
| *F02C 3/06* | (2006.01) |
| *F02C 3/10* | (2006.01) |
| *F04D 29/32* | (2006.01) |
| *F01D 5/06* | (2006.01) |
| *F02C 3/04* | (2006.01) |
| *F02C 7/28* | (2006.01) |
| *F02C 9/18* | (2006.01) |
| *F02K 1/06* | (2006.01) |
| *F02K 3/06* | (2006.01) |
| *F04D 29/38* | (2006.01) |
| *F16H 1/28* | (2006.01) |

(52) U.S. Cl.
CPC .............. *F01D 17/105* (2013.01); *F02C 3/04* (2013.01); *F02C 3/06* (2013.01); *F02C 3/10* (2013.01); *F02C 3/107* (2013.01); *F02C 7/28* (2013.01); *F02C 7/36* (2013.01); *F02C 9/18* (2013.01); *F02K 1/06* (2013.01); *F02K 1/09* (2013.01); *F02K 3/04* (2013.01); *F02K 3/06* (2013.01); *F04D 29/321* (2013.01); *F04D 29/325* (2013.01); *F04D 29/38* (2013.01); *F16H 1/28* (2013.01); *F05D 2220/32* (2013.01); *F05D 2220/36* (2013.01); *F05D 2230/60* (2013.01); *F05D 2240/12* (2013.01); *F05D 2240/24* (2013.01); *F05D 2240/35* (2013.01); *F05D 2240/52* (2013.01); *F05D 2240/54* (2013.01); *F05D 2240/60* (2013.01); *F05D 2260/40311* (2013.01)

(56) References Cited

U.S. PATENT DOCUMENTS

| | | | |
|---|---|---|---|
| 3,775,023 | A | 11/1973 | Davis et al. |
| 3,892,358 | A | 7/1975 | Gisslen |
| 4,130,872 | A | 12/1978 | Harloff |
| 4,704,862 | A | 11/1987 | Dennison et al. |
| 4,936,748 | A | 6/1990 | Adamson et al. |
| 5,431,539 | A | 7/1995 | Carvalho |
| 5,433,674 | A | 7/1995 | Sheridan et al. |
| 5,443,365 | A | 8/1995 | Ingling et al. |
| 5,447,411 | A | 9/1995 | Curley et al. |
| 5,524,847 | A | 6/1996 | Brodell et al. |
| 5,778,659 | A | 7/1998 | Duesler |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,464,401 | B1 | 10/2002 | Allard |
| 6,607,165 | B1 | 8/2003 | Manteiga et al. |
| 6,814,541 | B2 | 11/2004 | Evans et al. |
| 7,021,042 | B2 | 4/2006 | Law |
| 7,144,221 | B2 | 12/2006 | Griffin |
| 7,328,580 | B2 | 2/2008 | Lee et al. |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 7,997,868 | B1 | 8/2011 | Liang et al. |
| 8,137,070 | B2 | 3/2012 | Van Houten |
| 8,205,432 | B2 | 6/2012 | Sheridan |
| 2006/0024162 | A1 | 2/2006 | Giffin |
| 2007/0151258 | A1 | 7/2007 | Gaines et al. |
| 2008/0003096 | A1 | 1/2008 | Kohli et al. |
| 2008/0098717 | A1 | 5/2008 | Orlando et al. |
| 2009/0056343 | A1 | 3/2009 | Suciu et al. |
| 2010/0148396 | A1 | 6/2010 | Xie et al. |
| 2010/0218478 | A1 | 9/2010 | Merry et al. |
| 2010/0331139 | A1 | 12/2010 | McCune |
| 2011/0056208 | A1 | 3/2011 | Norris et al. |
| 2011/0123326 | A1 | 5/2011 | DiBenedetto et al. |
| 2011/0293423 | A1 | 12/2011 | Bunker et al. |
| 2012/0110979 | A1 | 5/2012 | Rosenkrans et al. |
| 2012/0251306 | A1 | 10/2012 | Reinhardt et al. |
| 2012/0263579 | A1 | 10/2012 | Otto et al. |
| 2012/0291449 | A1 | 11/2012 | Adams et al. |
| 2012/0315130 | A1 | 12/2012 | Hasel et al. |
| 2013/0025257 | A1 | 1/2013 | Suciu et al. |
| 2013/0025258 | A1 | 1/2013 | Merry et al. |
| 2013/0192198 | A1 | 8/2013 | Brilliant et al. |
| 2013/0318998 | A1 | 12/2013 | Schwarz et al. |

FOREIGN PATENT DOCUMENTS

| | | |
|---|---|---|
| EP | 3008323 | 4/2016 |
| GB | 1516041 | 6/1978 |
| GB | 2041090 | 9/1980 |
| WO | 2007038674 | 4/2007 |
| WO | 2014197155 | 12/2014 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 30-62, 85-87, 95-104, 121-123, 223-234, 242-245, 278-280, 303-309, 323-326, 462-479, 517-520, 563-565, 673-675, 382-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

International Search Report for PCT Application No. PCT/US2014/057434, completed Dec. 12, 2014.

V2500 Fact Sheet. International Aero Engines. Retrieved Jun. 15, 2012 from: http://i-a-e.com/wp-content/uploads/2012/03/facts.pdf.

(56) References Cited

OTHER PUBLICATIONS

Diagram. GE 90 Engine Airflow. Retrieved Jun. 15, 2012 from: http://ctr-sgi1.stanford.edu/CITS/ge90.html.
TFE 731-20 PR Sheet. Retrieved Jun. 15, 2012 from: http://design.ae.utexas.edu/subjet/workfTFE731_4.jpg.
Rolls Royce Trent 800, cutaway view. Retrieved Jun. 15, 2012 from: http://www.epower-propulsion.com/epower/gallery/ABP-RR%20Trent%20800%20cutaway.htm.
Rolls-Royce Trent cutaway view. Retrieved Jun. 15, 2012 from: http://web.mit.edu/aeroastro/labs/gtl/early_GT_history.html.
Garrett TFE 731-3 section view. Retrieved Jun. 15, 2012 from: http://perso.ovh.net/~caeaxtke/fr/coll/falcon50_5.html.
Rolls-Royce Trent 1000 cutaway view. Retrieved Jun. 15, 2012 from: http://hackedgadgets.com/2011/08/02/how-to-build-a-rolls-royce-trent-1000-engine-used-in-the-boeing-787/.
Rolls-Royce Trent cutaway view. Retrieved Jun. 15, 2012 from: http://www.warandtactics.com/smf/planet-earth-the-serious-stuff-non-mil-news/a-380-emergency-landingl/.
Avco Lycoming ALF502F-2 cutaway. Flight International, 2007. Retrieved from: http://www.flightglobal.com/airspace/media/aeroenginesjetcutaways/avco-lycoming-alf502r-2-cutaway-5582.aspx.
Lycoming LF507F cutaway. Flight International, 2007. Retrieved from: http://www.flightglobal.com/airspace/media/aeroenginesjetcutaways/avco-lycoming-alf502r-2-cutaway-5582.aspx.
Garrett TFE531 cutaway. Flight International, 2007. Retrieved from: http://www.flightglobal.com/airspace/medi/aeroenginesjetcutaways/avco-lycoming-alf502r-2-cutaway-5582.aspx.
General Electric F101. Jane's Aero-Engines. Oct. 11, 2012. IGH Global Limited, Coulsdon, United Kingdom.
General Electric F101. Scramble—The Aviation Magazine. Oct. 24, 2011. Retrieved May 17, 2013 retrieved from: http://wiki.scramble.nl/index.php?title=General_Electric_F101.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

(56) References Cited

OTHER PUBLICATIONS

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Walsh, Philip, et al. (2006). Gas Turbine Performance, John Wiley & Sons, Incorporated, 2006. ProQuest Ebook Central.
Extended European Search Report for European Patent Application No. 14864738.1 completed Jun. 20, 2017.

GEARED TURBOFAN ENGINE GEARBOX ARRANGEMENT

CROSS-REFERENCE TO RELATED APPLICATION

This is a continuation application of Ser. No. 14/496,574, filed Sep. 25, 2014, which is a divisional application of Ser. No. 14/087,471, filed Nov. 22, 2013, and entitled "Geared Turbofan Engine Gearbox Arrangement", the disclosure of which is incorporated by reference herein in its entirety as if set forth at length.

BACKGROUND

The disclosure relates to turbofan engines.

Gas turbine engines and similar structures feature a number of subassemblies mounted for rotation relative to a fixed case structure. Such engines typically have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1, which is incorporated herein by reference in its entirety and which is entitled "Bellows Preload and Centering Spring for a Fan Drive Gear System".

U.S. Patent Application Publication 2013/0192198, which is incorporated herein by reference in its entirety and which entitled "Compressor Flowpath", discloses a flowpath through a compressor having a low slope angle.

For controlling aspects of the flowpath passing through the fan duct, some turbofan engines include controllable features such as variable fan blade pitch and variable area fan exhaust nozzles. U.S. Pat. No. 5,431,539, which is incorporated herein by reference in its entirety and which is entitled "Propeller Pitch Change Mechanism", and U.S. Pat. No. 5,778,659, which is incorporated herein by reference in its entirety and which is entitled "Variable Area Fan Exhaust Nozzle Having Mechanically Separate Sleeve and Thrust Reverser Actuation System", disclose respective such systems.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

There are several different factors influencing flowpath geometry at certain locations in the engine. Weight, material strength and aerodynamics influence desirable core flowpath radius at different locations within the compressor and turbine sections. As noted above, U.S. Patent Application Publication 2013/0192198 discloses certain advantageous aspects of flowpath geometry within a compressor. This, however, may be competing with considerations regarding the core flowpath elsewhere in the engine. For example, the presence of an actuation mechanism or variable pitch fan blades may mandate a relatively large hub diameter. Similarly, the presence of a drive gear system axially between the compressor and the fan may also cause relatively high core flowpath diameters. Normally, it may be desirable to minimize radial turning of the core flow between such high radius sections and a lower diameter compressor section downstream thereof. Of particular importance to flowpath geometry and overall engine efficiency, however, are the bearing arrangements used to support the various rotating structures; improvements in this area are, therefore, always of interest to the turbofan engine designer.

SUMMARY

One aspect of the disclosure involves a three-spool turbofan engine comprising a fan having a plurality of blades. A transmission is configured to drive the fan. The fan blades have a peak tip radius $R_T$. The fan blades have an inboard leading edge radius $R_H$ at an inboard boundary of the flowpath. A ratio of $R_H$ to $R_T$ is less than about 0.40.

A further embodiment may additionally and/or alternatively include the engine being a three-spool turbofan engine comprising a first spool comprising a first pressure turbine and a first shaft coupling the first pressure turbine to the transmission. A second spool comprises a second pressure turbine, a first compressor, and a second spool shaft coupling the second pressure turbine to the second spool compressor. A core spool comprises a third pressure turbine, a second compressor, and a core shaft coupling the third pressure turbine to the second compressor. A combustor is between the second compressor and the third pressure turbine.

A further embodiment may additionally and/or alternatively include the first compressor having a rear hub engaging a bearing, said bearing engaging the first shaft, and another bearing engaging the first compressor and the first shaft.

A further embodiment may additionally and/or alternatively include a ring gear of the transmission being mounted to rotate with the fan as a unit.

A further embodiment may additionally and/or alternatively include each fan blade having a leading edge and a trailing edge. A splitter is positioned along a flowpath through the engine and having a leading rim separating a core branch of the flowpath from a bypass branch of the flowpath. An inboard boundary of the core flowpath has a radius $R_H$ at an axial position of the splitter rim and a radius $R_I$ at a leading stage of blades of the first compressor. A ratio of an axial length $L_{10}$ between the splitter rim and the leading stage of blades of the first compressor at the inboard boundary of the core flowpath to the radius $R_H$ is less than 1.2.

A further embodiment may additionally and/or alternatively include each fan blade having a leading edge and a trailing edge. A splitter is positioned along a flowpath through the engine and having a leading rim separating a core branch of the flowpath from a bypass branch of the flowpath. An inboard boundary of the core flowpath has a radius $R_H$ at an axial position of the splitter rim and a radius $R_I$ at a leading stage of blades of the first compressor. A ratio of the radius $R_I$ to the radius $R_H$ is greater than 0.50. The ratio of the radius $R_I$ to the radius $R_H$ may be 0.55-1.0.

A further embodiment may additionally and/or alternatively include the fan blades being non-variable.

A further embodiment may additionally and/or alternatively include a variable fan nozzle.

A further embodiment may additionally and/or alternatively include the engine having a plurality of main bearings. A first of said main bearings engages a static support and a forward hub of the second spool. A second of said main bearings engages the first shaft and the forward hub of the second spool.

A further embodiment may additionally and/or alternatively include the first bearing and the second bearing be behind the transmission.

A further embodiment may additionally and/or alternatively include a length between said first of said main bearings and a center of gravity of said rotor of the first compressor being less than half of a disk-to-disk overall length of the first compressor.

A further embodiment may additionally and/or alternatively include a length between said first of said main bearings and a center of gravity of a rotor of the second spool compressor being less than a radius $R_I$ of the inboard boundary of the core flowpath at a leading stage of blades of the first compressor.

A further embodiment may additionally and/or alternatively include the forward hub extending forward from a disk of the first compressor.

A further embodiment may additionally and/or alternatively include the forward hub extending forward from a bore of the disk of the first compressor.

A further embodiment may additionally and/or alternatively include the first compressor having at least one disk forward of said disk.

A further embodiment may additionally and/or alternatively include the static support passing through said at least one disk forward of said disk.

A further embodiment may additionally and/or alternatively include the first compressor having at least two disks forward of said disk.

A further embodiment may additionally and/or alternatively include said at least one disk being forward of a centerplane of the second bearing.

A further embodiment may additionally and/or alternatively include the first bearing and the second bearing being non-thrust roller bearings.

A further embodiment may additionally and/or alternatively include rollers of the first bearing and the second bearing being at least partially longitudinally overlapping.

A further embodiment may additionally and/or alternatively include a separation of a transverse centerplane of the first bearing and a transverse centerplane of the second bearing being less than a radius ($R_B$) of the first bearing.

A further embodiment may additionally and/or alternatively include a first seal sealing the first bearing and a second seal sealing the second bearing to isolate a transmission compartment ahead of the first bearing and the second bearing from a region behind the first bearing and the second bearing.

A further embodiment may additionally and/or alternatively include the transmission comprising: a sun gear mounted to rotate with the first shaft; a ring gear mounted to rotate with the fan; a plurality of intermediate gears between the sun gear and the ring gear; and a carrier holding the intermediate gears.

A further embodiment may additionally and/or alternatively include a third of said main bearings being a thrust bearing engaging the first spool shaft.

A further embodiment may additionally and/or alternatively include a fourth of said main bearings being a non-thrust roller bearings bearing engaging an aft end of the first spool shaft.

A further embodiment may additionally and/or alternatively include the core shaft engaging at least two of said main bearings, and wherein at least one of said at least two of said main bearings is a thrust bearing.

A further embodiment may additionally and/or alternatively include the first pressure turbine having three to five blade stages.

A further embodiment may additionally and/or alternatively include the second spool shaft engaging at least two of said main bearings, at least one of which is a thrust bearing.

A further embodiment may additionally and/or alternatively include an inter-shaft bearing axially locating the first spool shaft.

A further embodiment may additionally and/or alternatively include the first spool shaft engaging at least three of said main bearings.

A further embodiment may additionally and/or alternatively include the fan being a single-stage fan.

A further embodiment may additionally and/or alternatively include the ratio of $R_H$ to $R_T$ being less than about 0.30.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
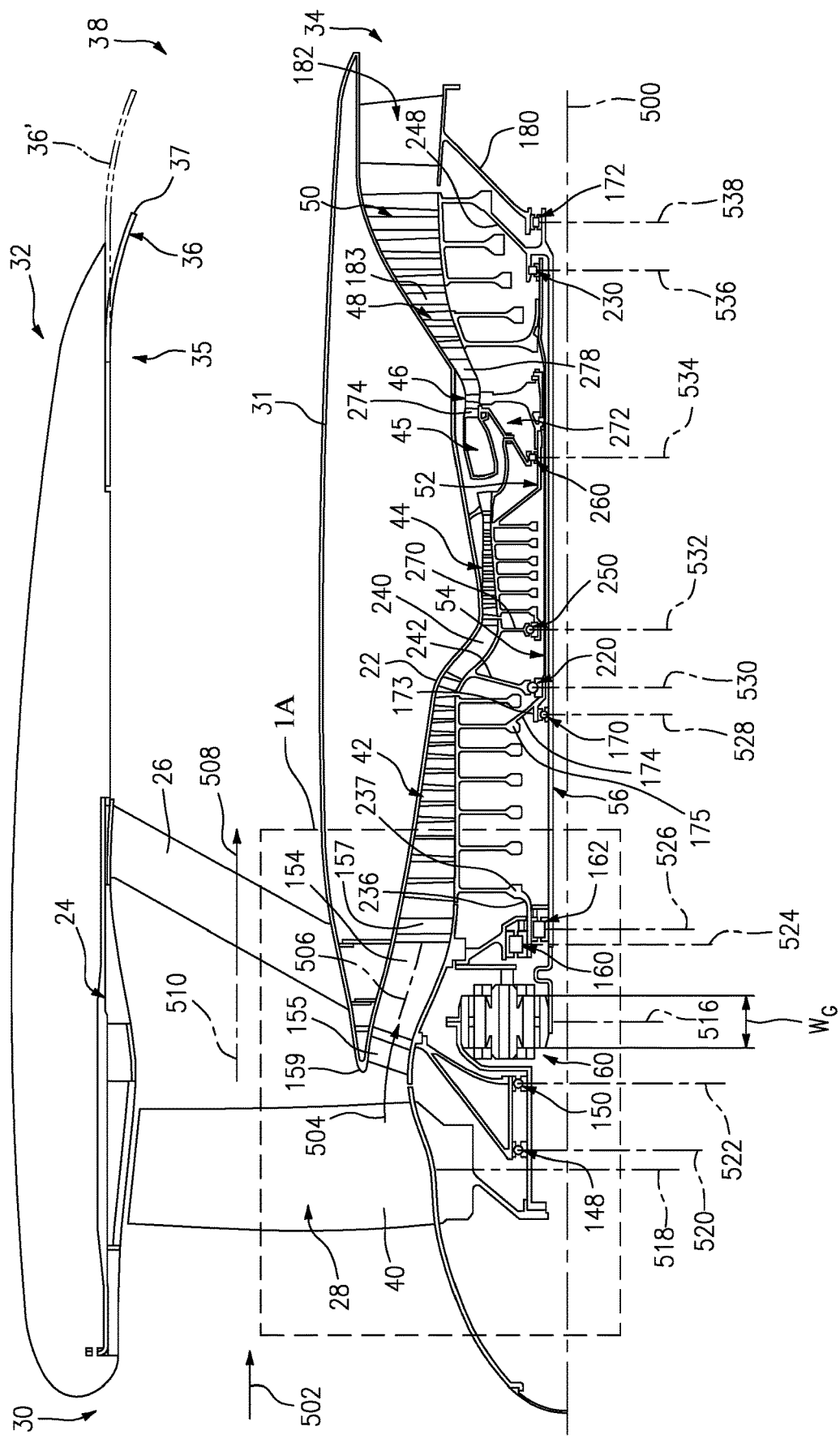
FIG. 1 is a schematic longitudinal sectional view of a first turbofan engine embodiment.

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding a fan 28. The core case and the fan case may have respective outboard aerodynamic nacelles (shown schematically as 31 and 32).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 (core branch of a combined flowpath) within the core case and a bypass flow 508 passing outboard along a bypass flowpath 510 (bypass branch of a combined flowpath) between the core case 22 and the fan case 24.

The bypass flowpath extends to an outlet 38. The exemplary outlet 38 is defined by a variable nozzle assembly 35. The exemplary variable nozzle assembly 35 includes a movable member 36 having a downstream/trailing end 37 for defining the outlet between the end 37 and the core nacelle 31. The exemplary member 36 may articulate between at least two conditions or positions. The exemplary articulation involves an axial translation between a forward/retracted condition or position shown in solid line and a rearward/extended condition or position shown in broken line with the numeral 36'. The translation may be driven by an actuator (not shown) (e.g., a hydraulic actuator).

The core flow 504 (or a majority portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50. The fan and compressor sections (and their stages) progressively compress inlet air which passes into the combustor for combustion with fuel to generate gas of increased pressure which passes downstream through the turbine sections where the gas pressure is progressively reduced as work is extracted. The turbine section 46 operates at a pressure that is higher than the intermediate turbine 48 and the low turbine 50 and is often referred to as a high (or third) pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at a pressure range that is intermediate to the low and high pressure sections 50 and 46. The turbine section 48 is thus often referred to as an intermediate (or second) pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range relative to the high pressure turbine 46 and the intermediate pressure turbine 48 and is thus often referred to as a low (or first) pressure turbine (LPT) or as a fan drive turbine. The LPT blade stages are connected via a shaft 56 ("low shaft") to a transmission 60 (e.g., an epicyclic transmission, more particularly a geared system known as a fan drive gear system (FDGS)) to indirectly drive the fan 28 with a speed reduction.

An exemplary high pressure turbine 46 is a single or double stage turbine assembly (although three or more HPT stages are possible); an exemplary intermediate stage turbine 48 is a single or double stage turbine assembly (although three or more IPT stages are possible); an exemplary low pressure turbine 50 is a multi-stage turbine such as, for example, one or more stages, or more specifically three to five stages (although one or two stages is also possible).

The exemplary transmission 60 (FIG. 1A) comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective bearing axes. The exemplary bearings 88 may be rolling element bearings (e.g., ball or roller bearings) or may be journal bearings having external circumferential surface portions closely accommodated within internal bore surfaces of the associated intermediate gears 84. Regardless of the type, the bearings may be metallic (such as aluminum titanium, other metal, or an alloy of more than one metal), ceramic, composite, or other material.

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary carrier assembly 86 is substantially non-rotatably mounted relative to the engine case 22. In the exemplary embodiment, the carrier assembly 86 is coupled to the case 22 via a compliant flexure 110 that allows at least small temporary radial and axial excursions and rotational excursions transverse to the centerline 500. The exemplary flexure 110 carries a circumferential array of fingers 111 engaging the carrier 86 (e.g., between adjacent gears 84). A peripheral portion of the flexure 110 is mounted to the case to resist rotation about the centerline 500. Thus, flexing of the flexure accommodates the small excursions mentioned above while holding the carrier against rotation about the centerline.

The exemplary ring 82 is coupled to the fan 28 to rotate with the fan 28 as a unit. In the exemplary embodiment a rear hub 122 of a main fan shaft 120 connects the fan 28 to the ring gear 82.

The speed reduction ratio is determined by the ratio of diameters of the ring gear 82 to the sun gear 80. This ratio will substantially determine the maximum number of intermediate gears 84 in a given ring. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1, which is incorporated by reference herein in its entirety and which is entitled "Fan Rotor Support. In addition, although the exemplary transmission 60 is described as being of a "star" type configuration, other types of configurations (such as "planetary" systems) are within the scope of this invention.

Thus, the exemplary engine 20 has four main rotating components (units) rotating about the centerline 500: the core spool (including the high pressure turbine 46, the high shaft 52, and the high pressure compressor 44); the intermediate spool (including the intermediate pressure turbine 48, the intermediate shaft 54, and the intermediate pressure compressor 42); the low spool (including the low pressure turbine 50, low shaft 56, and the sun gear 80); and the fan assembly (including the fan 28 itself, the fan shaft 120, and the ring gear 82). Each of these four things needs to be supported against: radial movement; overturning rotations transverse to the centerline 500; and thrust loads (parallel to the centerline 500). Radial and overturning movements are prevented by providing at least two main bearings engaging each of the four units.

Each unit would have to also engage at least one thrust bearing. The nature of thrust loads applied to each unit will differ. Accordingly, the properties of the required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

The FIG. 1 embodiment has two main bearings 148, 150 along the fan shaft forward of the transmission 60. Inboard, the inner race of each bearing 148, 150 engages a forward portion of the shaft 120 aft of the fan 28. Outboard, the outer race of each bearing 148, 150 engages static structure of the case. The exemplary static structure comprises a support 152 extending inward and forward from a forward frame 154. These two bearings 148, 150 thus prevent radial excursions and overturning moments which the fan 28 may produce during flight.

To resist thrust loads, one or both of the bearings 148, 150 may be thrust bearings. In an exemplary embodiment, both are thrust bearings (schematically shown as ball bearings). Both may be thrust bearings because there may typically be no differential thermal loading (and thus thermal expansion) of the support 152 relative to the shaft 120 between these bearings. Where the two coupled structures are subject to differences in thermal expansion, it may be desirable to have only one bearing be a thrust bearing.

In one alternative example of a single thrust bearing and a single non-thrust bearing, the bearing 150 would be a straight roller bearing with longitudinal roller axes configured to only handle radial loads. The other bearing (i.e., the bearing 148) would be a thrust bearing. Due to the significance of forward thrust loads on the fan 28, the bearing 148 may be biased to resist forward loads. The exemplary bearing 148 may then be a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard, which is incorporated herein by reference in its entirety and which is entitled "High Load Capacity Bi-Directional Tapered Roller Bearing". Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine.

The exemplary low shaft 56 is principally radially supported by a forward bearing 162, an intermediate bearing 170, and an aft bearing 172. The exemplary forward bearing 162 is indirectly radially grounded to the case 22. An exemplary indirect grounding (discussed further below) is via the intermediate spool and bearing 160. The exemplary bearing 160 (FIG. 1A) is directly radially grounded to the case (e.g., by a bearing support 164 extending inward from a frame 154 aft of the support 152). FIG. 1 also shows an inlet guide vane array 155 immediately upstream of the struts of the frame 154 and an outlet guide vane array 157 immediately downstream of the frame 154 and upstream of the leading compressor stage. In exemplary implementations, the vanes of the array 157 may be variable vanes. The exemplary array 155 is immediately downstream of a splitter 159 dividing the core flowpath from the bypass flowpath.

The exemplary bearing 170 intervenes directly between the low spool and intermediate spool at an intermediate location. In the exemplary embodiment, it is indirectly radially grounded by the bearing 220. The bearing 220 is directly radially grounded by a support 240 extending radially inward from a structural vane array (frame) 242 between the compressor sections 42 and 44.

The exemplary aft bearing 172 is directly radially grounded to the case 22 via a support 180 extending inward from a frame 182 extending across the core flowpath 504. The exemplary support 180 is aft of the LPT 50 with the frame 182 being a turbine exhaust frame. Alternative implementations may shift the support 180 forward of the LPT 50 to engage an inter-turbine frame 183 between the turbine sections 48 and 50.

In the exemplary embodiment, the bearings 162 and 172 are non-thrust roller bearings (e.g., straight roller bearings). The bearing 170 serves as inter-shaft thrust bearing (e.g., a bidirectional ball bearing) having an inner race engaging an intermediate portion of the low shaft 56 and an outer race engaging the intermediate shaft 54 to indirectly axially ground the low shaft 56 to the case 22 via the intermediate shaft 54.

By locating the bearing 170 relatively axially close to the bearing 220, the bearing 170 may also provide an intermediate location of radial grounding in addition to the forward and aft radial groundings provided by the bearings 162 and 172. Alternative implementations might eliminate or reduce the amount of this radial grounding. In the FIG. 1 example, the bearings 160 and 162 are stacked so close as to be partially axially overlapping (i.e., axial overlap of their rollers) to provide a high degree of radial support.

In contrast, there is a slight non-overlap forward shift of the bearing 170 relative to the bearing 220. In the exemplary engine, the outer race of the bearing 170 engages a forwardly-projecting support extending forward from a rear hub 174 of the compressor section 42. The exemplary rear hub 174 extends from a bore 175 of one of the disks of the compressor section 42. Slight flexing of the hub 174 and the outer bearing support 173 protruding therefrom may provide a little more radial compliance than associated with the forward bearing 162.

The intermediate spool is supported by forward bearing 160, intermediate bearing 220, and an aft bearing 230. In an exemplary embodiment, forward bearing 160 is a non-thrust roller bearing providing radial retention only. The inner race of the bearing 160 (and outer race of the bearing 162) are mounted along respective outer and inner faces of a hub or support 236 extending forward from the bore 237 of one of the disks of the compressor section 42 (e.g., the first (upstream-most) disk). The exemplary intermediate bearing 220 is a bidirectional thrust bearing (e.g., ball bearing) directly radially and axially supporting/grounding the intermediate spool via the support 240 extending to the inter-compressor frame 242 between the compressor sections 42 and 44. The bearing 230 indirectly radially supports/grounds the intermediate spool by engaging the intermediate spool and the low spool. In the exemplary embodiment, the inner race of the bearing 230 engages a portion of the intermediate shaft aft of the turbine section 48 and the outer race of the bearing 230 engages a support extending forward from a hub 248 of the LPT 50. The exemplary hub 248 extends forward from the bore of a disk (e.g., the last or downstream-most disk) of the LPT.

The radial loads on the intermediate spool at the bearing 230 will primarily be transmitted to the low shaft 56 and through an aft portion of the low shaft 56 to the bearing 172 and grounded by the support 180 and frame 182. Axial (thrust) loads will pass through the bearing 220.

Thus, thrust loads on the low spool are transmitted via the shaft 56 through the bearing 170, through the intervening portion of the intermediate shaft/spool, to the bearing 220, and grounded back through the support 240.

The core spool may be fully directly supported by two bearings 250 and 260 of which at least one would be a thrust bearing. In the exemplary embodiment, the bearing 250 is a forward bearing grounding a forward portion of the core shaft ahead of the compressor section 44 to the inter-compressor frame 242 via a support 270. The aft bearing 260 grounds a portion of the core shaft intermediate the compressor section 44 and turbine section 46 via a support 272 extending to a combustor frame 274 ahead of the turbine section 46. In alternative embodiments, this aft bearing 260 may be shifted aft of the turbine section 46 via a support (not shown) to an inter-turbine frame 278 between the sections 46 and 48. In the exemplary implementation, the bearing 250 is a thrust bearing (e.g., a bidirectional ball bearing with its inner race engaging the core spool and its outer race engaging the support 270). The exemplary bearing 260 is a straight roller bearing with its inner race engaging the core shaft 52 and its outer race engaging the support 272. The exemplary support 270 extends to a rear portion of the frame 240 aft of the support 242. The exemplary inner race of the bearing 250 is mounted to a hub or support extending forward from a bore of a disk (e.g., the upstream-most disk) of the compressor section 44.

FIG. 1 further shows the transmission 60 as having a centerplane 516 and the gears as having a gear width $W_G$ and the fan blade array as having a centerplane 518. From fore to aft, the bearings have respective centerplanes 520, 522, 524, 526, 528, 530, 532, 534, 536, and 538.

As discussed above, an exemplary embodiment places the centerplanes 524 and 526 of the bearings 160 and 162 relatively close to each other so as to best transmit radial loads from the low shaft 56 to the case. An exemplary separation between the planes 524 and 526 (FIG. 1A) in such embodiments is less than the characteristic radius of the bearing 160 (e.g., radius $R_B$ relative to the axis 500 of the intersections of the individual rolling element axes with the bearing centerplane). In contrast, the exemplary embodiment has a greater separation between the centerplanes 528 and 530 of the bearings 170 and 220. This may provide a greater radial compliance at the associated intermediate location.

Figure 1A:
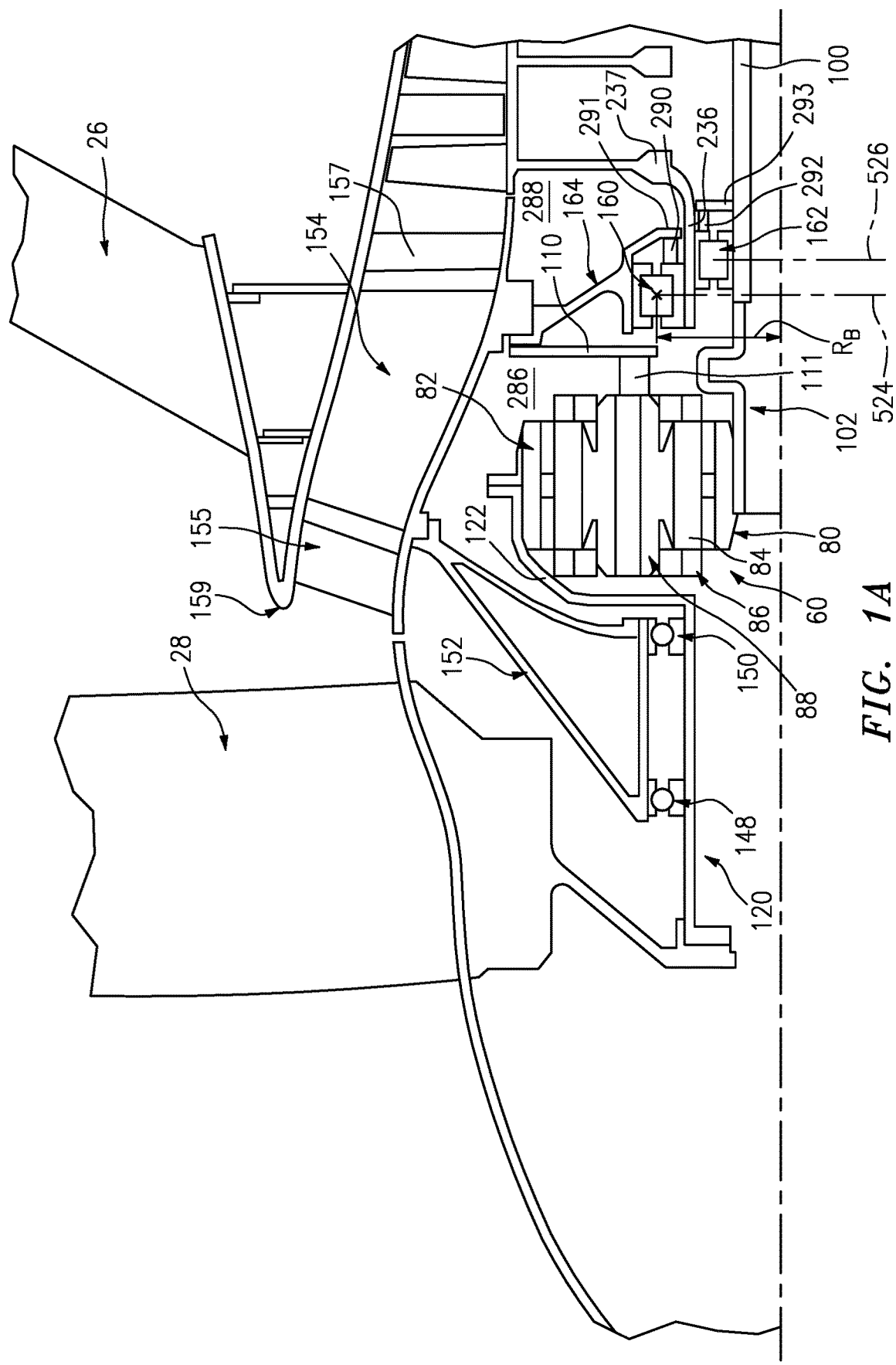
FIG. 1A is an enlarged view of a forward portion of the engine of FIG. 1.

FIG. 1A further shows a transmission compartment 286 containing the transmission 60. Aftward, the transmission compartment is largely bounded by the support 164 and bearings 160 and 162. Seals may be provided to seal the transmission compartment 286 from a region 288 (e.g., a compressor compartment) aft thereof. The exemplary seals comprise an outer seal 290 sealing between the static structure and the intermediate spool and an inner seal 292 sealing between the intermediate spool and the low spool. Exemplary seal 290 is held by a carrier 291. An exemplary carrier 291 is formed as an inward and aftward extension of the support 164 holding the seal 290 in sliding/sealing engagement with the low spool (e.g., with an inner race of the bearing 160). Similarly, a seal carrier 293 carries the exemplary seal 292. In the exemplary embodiment, the seal carrier 293 is mounted to or formed as a portion of the low shaft main portion 100 holding the seal 292 in sealing and sliding engagement with the intermediate spool (e.g., with an outer race of the bearing 162). In alternative implementations, the carrier and seal elements of one or both of the sealing systems may be reversed (e.g., the seal carrier 293 could be formed as a portion of the hub 236 holding the seal 292 in sliding/sealing engagement with the low spool).

Figure 2:
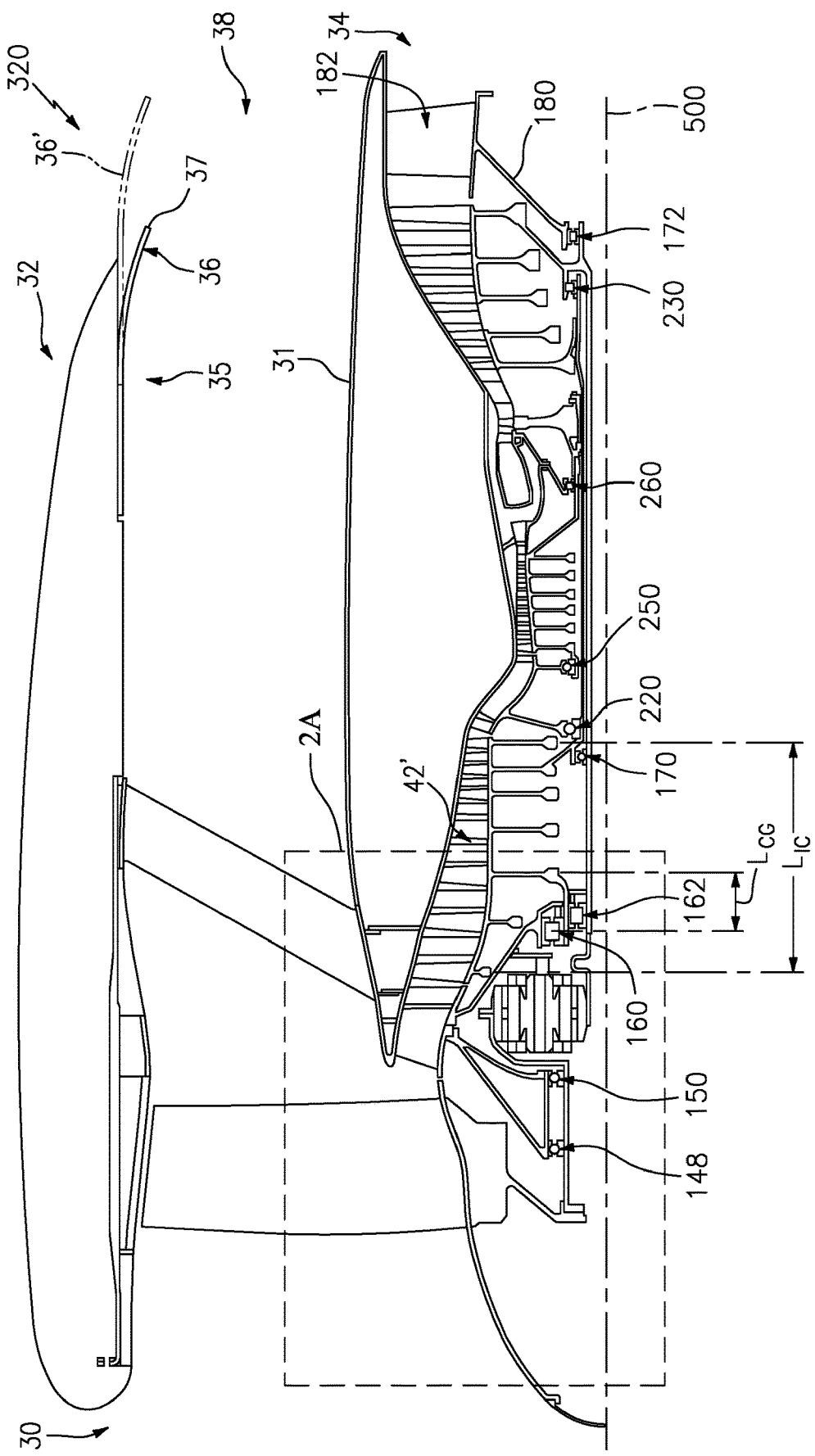
FIG. 2 is a schematic longitudinal sectional view of a second turbofan engine embodiment.

FIG. 2 shows an alternate embodiment 320 which may be otherwise similar to the engine 20 but which has a forward shift of its compressor section 42' relative to the compressor section 42 of FIG. 1. The exemplary forward shift may be achieved by having the hub or support structure 236 (FIG. 2A) that cooperates with the bearings 160 and 162 extend forward from the bore 237' of an intermediate disk of the compressor section 42' in distinction to the extension from the upstream-most disk of the compressor section 42. In the exemplary engine 320, the hub 236 (FIG. 2A) extends from the third disk leaving two disks and their associated blade stages thereahead. The exemplary shift shifts at least one disk stage forward of the bearings 160 and/or 162. In this example, the longitudinal position of the first disk (e.g., measured by the centerplane of its web and/or bore) is shifted ahead of the centerplanes of the bearings 160 and 162. An exemplary shift places the first disk ahead of both bearings 160 and 162 and the second disk ahead of only the bearing 162. However, other locations and combinations are possible.

Figure 2A:
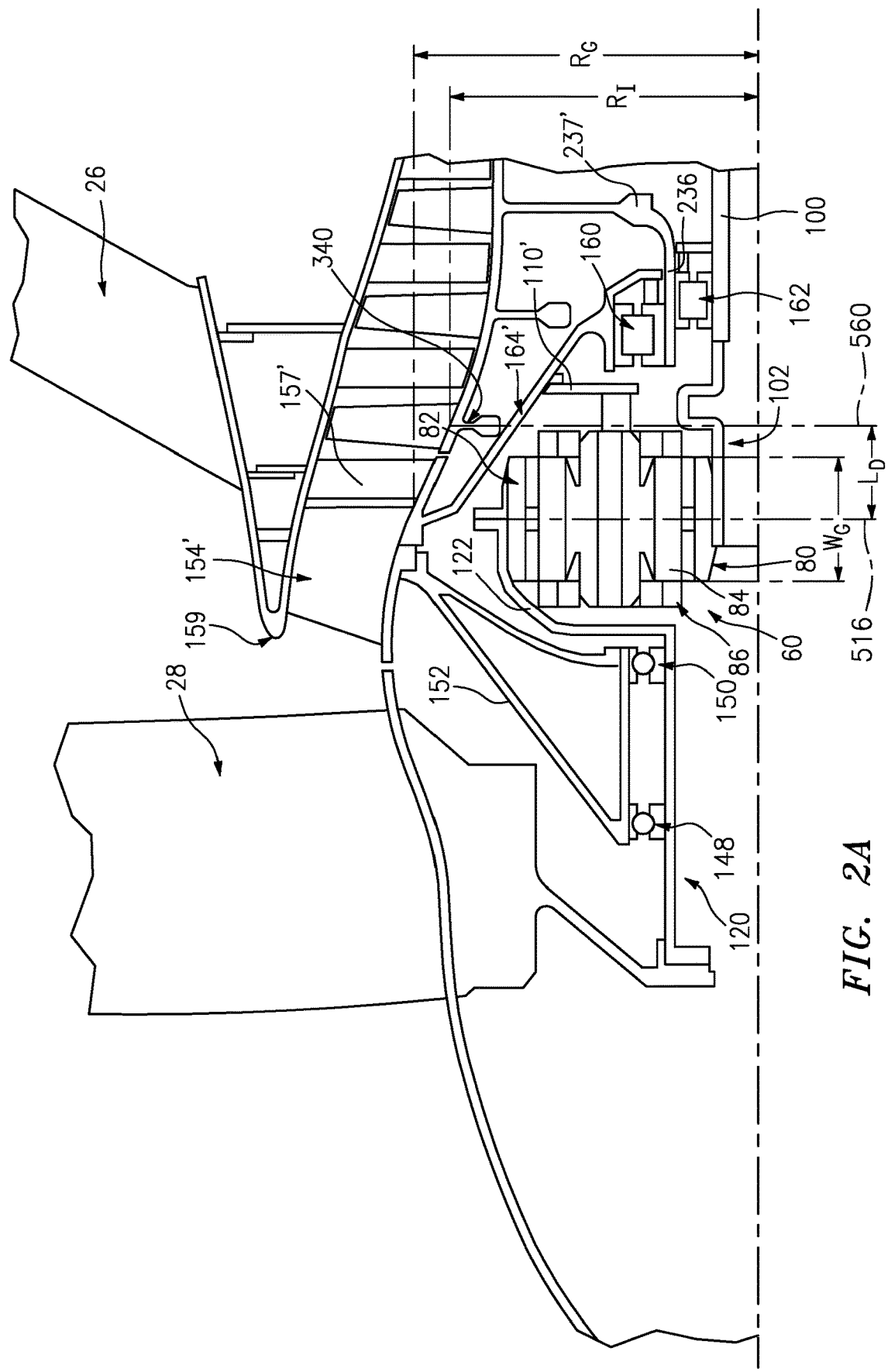
FIG. 2A is an enlarged view of a forward portion of the engine of FIG. 2.

A further characterization of the longitudinal compactness involves the relationship between the first disk and the transmission. FIG. 2A shows a centerplane 560 of the first disk 340. The centerplane 560 is behind the gear centerplane 516 by a length $L_D$. Exemplary $L_D$ is 2.0 times the gear width $W_G$ or less, more particularly, 1.5 times $W_G$ or less. Alternatively characterized, exemplary $L_D$ is 60% or less of the core flowpath inboard radius $R_I$ at the disk centerplane 560, more particularly, 50% or less or 35% or less of $R_I$.

Yet alternatively characterized relative to such a core flowpath inboard radius $R_G$ at the gear centerplane 516, exemplary $L_D$ is 50% of $R_G$ or less, more particularly, 40% or less or 30% or less.

To further facilitate longitudinal compactness, relative to the engine 20, the engine 320 axially shrinks the frame 154' relative to the frame 150. In this example, the frame 154' and its associated struts replace both the frame 154 and its associated struts and the inlet guide vane array 155 (FIG. 1A). The guide vane array 157 (FIG. 1A) downstream of the struts is effectively shifted forward to become 157'. Along with the foreshortening of the frame 154', the outboard periphery and mounting location of the support 164 is shifted forward and outward to become 164'. Thus, the exemplary support 164' is shallower than support 164 and partially overarches the span of the transmission gears. Because of this overarching, the fingered flexure 110 is shifted to be mounted to a mounting feature (e.g., flange) 110' along the support 164'.

Figure 3:
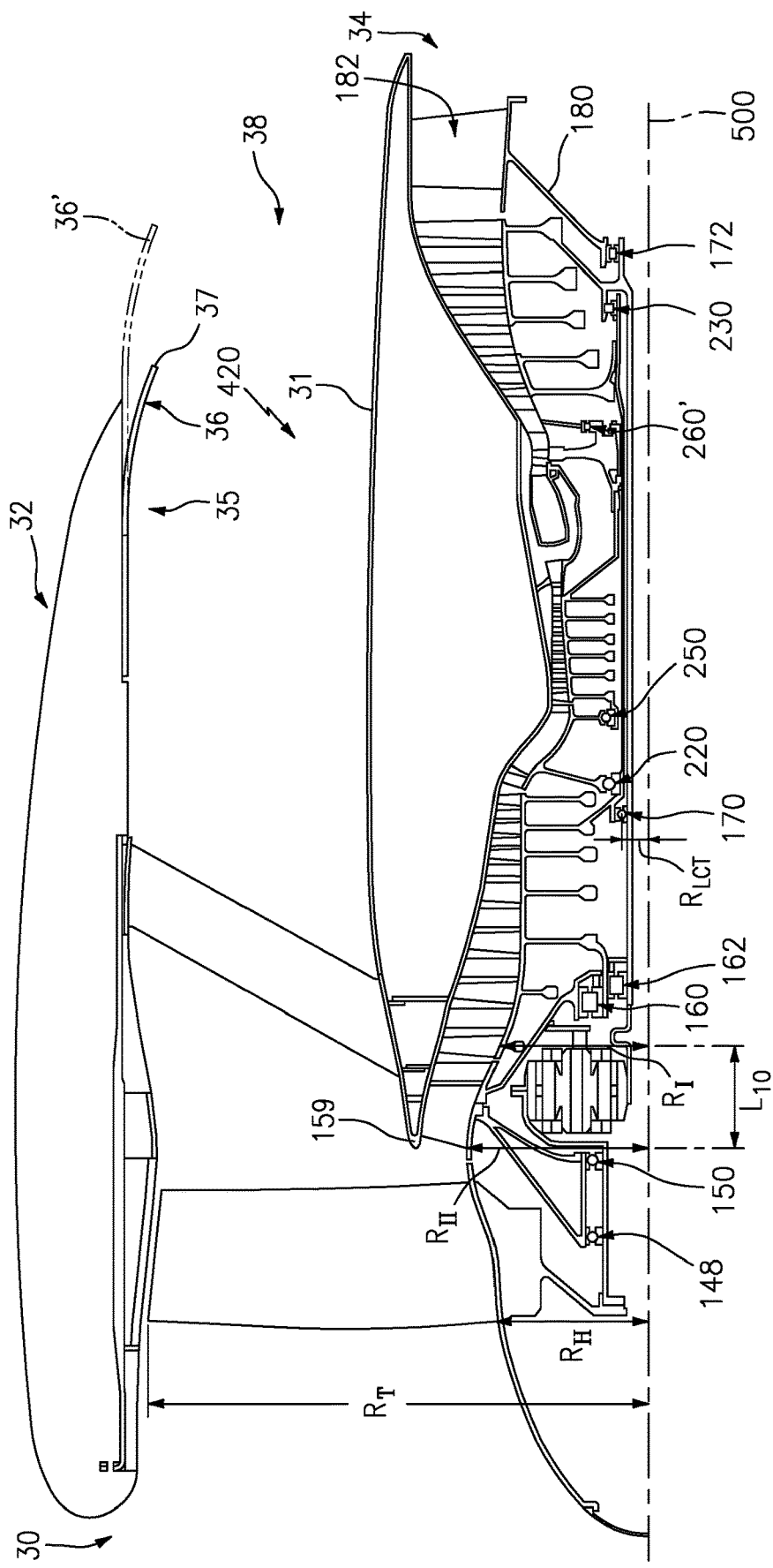
FIG. 3 is a schematic longitudinal sectional view of a third turbofan engine embodiment.
Figure 4:
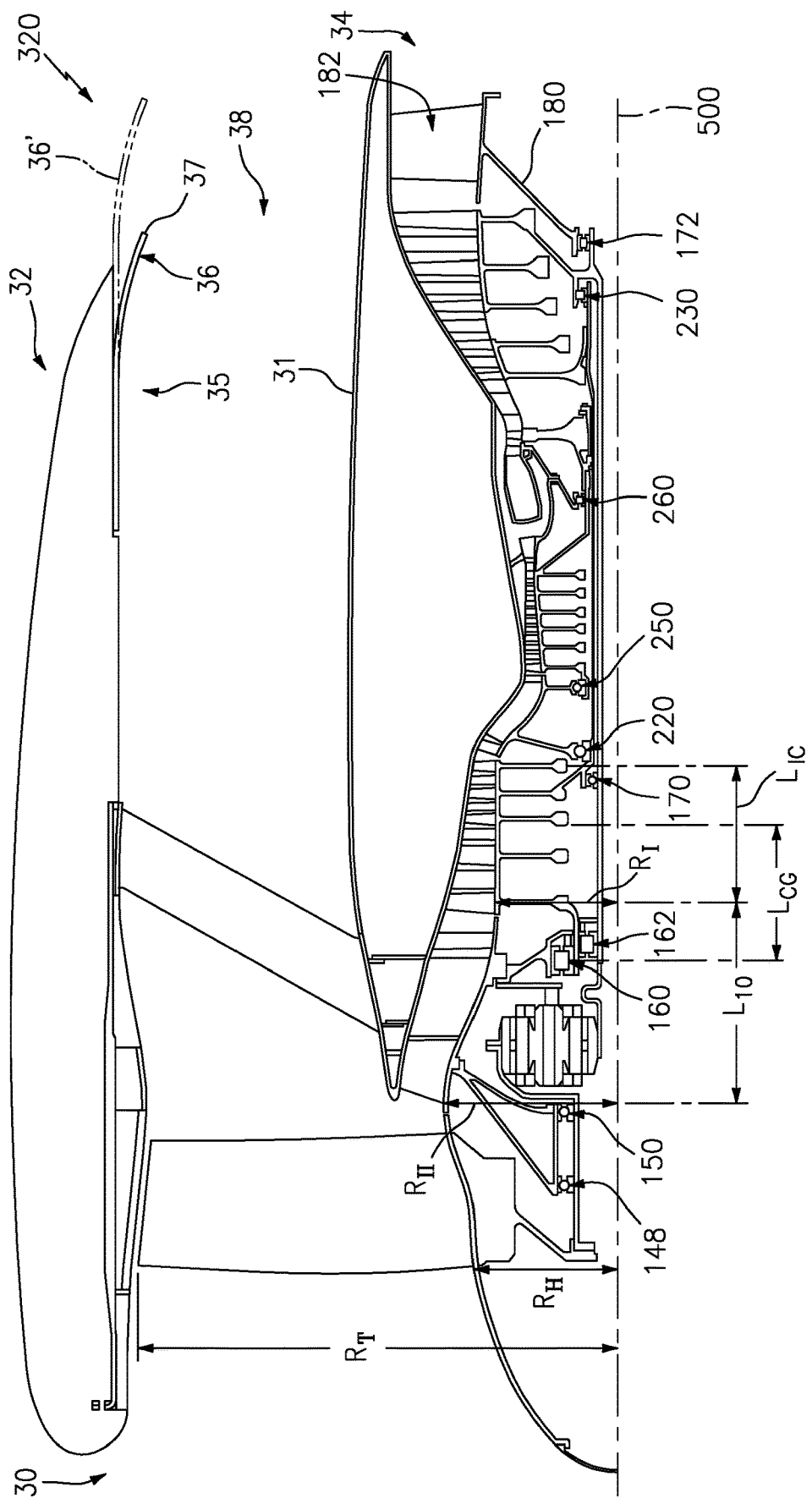
FIG. 4 is a schematic longitudinal sectional view of a fourth turbofan engine embodiment.

FIG. 3 shows yet a further embodiment 420 reflecting the variation discussed above wherein the bearing 260 is shifted aft of the high pressure turbine section 46. Other variations might add a second intermediate spool. Other variations include unducted fans. Other variations include multi-stage fans. FIG. 4 shows an axially compact engine lacking the forward shift of the FIG. 3 embodiment but, instead, being otherwise similar to FIG. 1 from the leading compressor disk forward. LPC stage count, however, is reduced relative to the FIG. 1 embodiment so that the rear end of the LPC is shifted forward relative to the FIG. 1 embodiment as is the rear end of the LPC of the FIG. 3 embodiment.

FIG. 4 further shows various radial measurements. A fan tip radius is shown as $R_T$. In this exemplary embodiment, the tip maximum radius is at the blade leading edge. FIG. 4 further shows a characteristic hub radius $R_H$. Exemplary $R_H$ is defined as the flowpath inboard or inner diameter (ID) radius at the fan blade leading edge. FIG. 4 further shows a core inlet inner radius $R_{II}$ which is measured as the inboard or ID radius of the core flowpath at the axial position of the forward rim of the splitter 159. A characteristic compressor inlet radius may be measured as the aforementioned $R_I$. Alternatively, this radius may be measured at the leading edge of the associated upstreammost blade stage. These will typically be very close to each other.

FIG. 4 further shows an axial length $L_{10}$ between the locations at which $R_{II}$ and $R_I$ are measured. FIGS. 2 and 4 also label a length $L_{CG}$ between a centerplane of the bearing 160 which may represent the closest main bearing behind the FDGS, the forwardmost bearing intervening directly (between the intermediate spool and the case or both) and the transverse plane of the center of gravity of the intermediate pressure compressor rotor (e.g., ignoring the intermediate pressure shaft aft of the bearing 170 and ignoring the intermediate pressure turbine rotor). A characteristic intermediate pressure compressor length $L_{IC}$ is shown as the center-to-center axial distance between the leading and trailing disks. Particularly, with the forward shifting of the IPC of the embodiments of FIGS. 2 and 3 but also with the foreshortening of the embodiment of FIG. 4, $L_{CG}$ may be reduced relative to FIG. 1. The exemplary $L_{CG}$ may be reduced to less than $R_{II}$ and even to less than $R_I$. $L_{CG}$ may also be reduced to less than one half of $L_{IC}$ (e.g., as shown in FIGS. 2 and 3). The particular reconfiguration of FIGS. 2 and 3 helps bring the center of gravity close to the plane of the bearing 160 to maintain stability. This stability reduces the radial loads that must be reacted by the bearing 220. Thus, the bearing 170 may be more specifically configured for reacting thrust loads with less capacity to react radial loads and may be lightened.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic configuration, details of such configuration or its associated environment may influence details of particular implementations. Accordingly, other embodiments are within the scope of the following claims.

What is claimed is:

1. A turbofan engine comprising:
    a fan having a plurality of blades rotatable about a longitudinal axis;
    a transmission configured to drive the fan; and
    a first spool and a second spool, wherein:
    the plurality of fan blades have a peak tip radius $R_T$;
    the plurality of fan blades have an inboard leading edge radius $R_H$ at an inboard boundary of a flowpath;
    a ratio of $R_H$ to $R_T$ is less than 0.40;
    said first spool comprises:
        a first pressure turbine; and
        a first spool shaft coupling the first pressure turbine to the transmission;
    said second spool comprises:
        a second pressure turbine;
        a first compressor; and
        a second spool shaft coupling the second pressure turbine to the first compressor;
    the engine comprises a plurality of main bearings wherein:
        a first of said main bearings engages a static support and a forward hub of the second spool; and
        a second of said main bearings engages the first spool shaft and the forward hub of the second spool;
    the fan is a single-stage fan; and
    a ring gear of the transmission is mounted to rotate with the fan as a unit.

2. The turbofan engine of claim 1, wherein:
    each fan blade of the plurality of fan blades has a leading edge and a trailing edge;
    a splitter is positioned along the flowpath through the turbofan engine and having a leading rim separates a core branch of the flowpath from a bypass branch of the flowpath;
    an inboard boundary of the core branch of the flowpath has a radius $R_{II}$ at an axial position of the splitter rim;
    the inboard boundary of the core branch of the flowpath has a radius $R_I$ at a leading stage of blades of the first compressor; and
    a ratio of an axial length $L_{10}$ between the splitter rim and the leading stage of blades of the first compressor at the inboard boundary of the core branch of the flowpath to the radius $R_{II}$ is less than 1.2.

3. The turbofan engine of claim 1, wherein:
    each fan blade of the plurality of fan blades has a leading edge and a trailing edge;
    a splitter is positioned along the flowpath through the turbofan engine and having a leading rim separates a core branch of the flowpath from a bypass branch of the flowpath;
    an inboard boundary of the core branch of the flowpath has a radius $R_{II}$ at an axial position of the splitter rim;
    the inboard boundary of the core branch of the flowpath has a radius $R_I$ at a leading stage of blades of the first compressor; and
    a ratio of the radius $R_I$ to the radius $R_{II}$ is greater than 0.50 and is less than 1.0.

4. The turbofan engine of claim 3, wherein:
    said ratio of the radius $R_I$ to the radius $R_{II}$ is 0.55-1.0.

5. The turbofan engine of claim 4, wherein:
    the plurality of fan blades are non-variable.

6. The turbofan engine of claim 5, further comprising:
    a variable fan nozzle.

7. The turbofan engine of claim 6, wherein:
    the forward hub extends forward from a disk of the first compressor.

8. The turbofan engine of claim 7, wherein:
    the forward hub extends forward from a bore of the disk of the first compressor.

9. The turbofan engine of claim 1, wherein:
    a separation of a transverse centerplane of the first bearing and a transverse centerplane of the second bearing is less than a radius ($R_B$) of the first bearing.

10. The turbofan engine of claim 1, wherein:
    a first seal, seals the first bearing and a second seal seals the second bearing to isolate a transmission compartment ahead of the first bearing relative to the longitudinal axis and the second bearing from a region behind the first bearing and the second bearing relative to the longitudinal axis.

11. The turbofan engine of claim 1, wherein:
the transmission comprises:
a sun gear mounted to rotate with the first shaft;
said ring gear;
a plurality of intermediate gears between the sun gear and the ring gear; and
a carrier holding the intermediate gears.

12. The turbofan engine of claim 11, wherein:
a third of said main bearings is a thrust bearing engaging the first spool shaft; and
a fourth of said main bearings is a non-thrust roller bearing engaging an aft end of the first spool shaft.

13. The turbofan engine of claim 1, wherein:
said second pressure turbine is a high pressure turbine; and
said first compressor is a high pressure compressor.

14. The turbofan engine of claim 13, wherein:
the first pressure turbine has three to five blade stages.

15. The turbofan engine of claim 14, wherein:
the second spool shaft engages at least two of said main bearings, at least one of which is a thrust bearing.

16. The turbofan engine of claim 15, wherein the ratio of $R_H$ to $R_T$ is less than 0.30.

17. A turbofan engine comprising:
a fan having a plurality of blades rotatable about a longitudinal axis;
a transmission configured to drive the fan; and
a first spool and a second spool, wherein:
the plurality of fan blades have a peak tip radius $R_T$;
the plurality of fan blades have an inboard leading edge radius $R_H$ at an inboard boundary of a flowpath;
a ratio of $R_H$ to $R_T$ is less than 0.40;
said first spool comprises:
a first pressure turbine; and
a first shaft coupling the first pressure turbine to the transmission;
said second spool comprises;
a second pressure turbine;
a first compressor; and
a second spool shaft coupling the second pressure turbine to the first compressor;
the engine comprises a plurality of main bearings wherein:
a first of said main bearings engages a static support and a forward hub of the second spool; and
a second of said main bearings engages the first shaft and the forward hub of the second spool; and
the first bearing and the second bearing are behind the transmission relative to the longitudinal axis.

18. The turbofan engine of claim 17, wherein:
the transmission comprises:
a sun gear mounted to rotate with the first shaft;
a ring gear mounted to rotate with the fan;
a plurality of intermediate gears between the sun gear and the ring gear; and
a carrier holding the intermediate gears.

19. The turbofan engine of claim 17, wherein:
the fan is a single-stage fan.

20. The turbofan engine of claim 17, wherein the ratio of $R_H$ to $R_T$ is less than 0.30.

21. A turbofan engine comprising:
a fan having a plurality of blades;
a transmission configured to drive the fan; and
a first spool and a second spool, wherein:
the plurality of fan blades have a peak tip radius $R_T$;
the plurality of fan blades have an inboard leading edge radius $R_H$ at an inboard boundary of a flowpath;
a ratio of $R_H$ to $R_T$ is less than 0.40;
said first spool comprises:
a first pressure turbine; and
a first spool shaft coupling the first pressure turbine to the transmission;
said second spool comprises;
a second pressure turbine;
a first compressor; and
a second spool shaft coupling the second pressure turbine to the first compressor;
the first compressor has a rear hub engaging a bearing;
said bearing engages the first shaft; and
another bearing engages the first compressor and the first shaft.

22. The turbofan engine of claim 21, wherein:
the transmission comprises:
a sun gear mounted to rotate with the first shaft;
a ring gear mounted to rotate with the fan;
a plurality of intermediate gears between the sun gear and the ring gear; and
a carrier holding the intermediate gears.

23. The turbofan engine of claim 21, wherein:
the fan is a single-stage fan.

24. The turbofan engine of claim 23, wherein the ratio of RH to RT is less than 0.30.

* * * * *